US012183243B2

(12) United States Patent
Zhong et al.

(10) Patent No.: US 12,183,243 B2
(45) Date of Patent: Dec. 31, 2024

(54) CONTROL METHOD AND CONTROL DEVICE FOR DISPLAY PANEL, STORAGE MEDIUM, AND ELECTRONIC DEVICE

(71) Applicant: Xiamen Tianma Display Technology Co., Ltd., Xiamen (CN)

(72) Inventors: Chen Zhong, Xiamen (CN); Meng Lai, Xiamen (CN); Qiang Chen, Xiamen (CN); Jingxiong Zhou, Xiamen (CN); Zhiqiang Xia, Xiamen (CN); Wenlan Liu, Xiamen (CN); Yinzeng Li, Xiamen (CN); Ying Sun, Xiamen (CN); Liujing Fan, Xiamen (CN)

(73) Assignee: Xiamen Tianma Display Technology Co., Ltd., Xiamen (CN)

(*) Notice: Subject to any disclaimer, the term of this patent is extended or adjusted under 35 U.S.C. 154(b) by 0 days.

(21) Appl. No.: 18/131,719

(22) Filed: Apr. 6, 2023

(65) Prior Publication Data

US 2024/0221574 A1 Jul. 4, 2024

(30) Foreign Application Priority Data

Dec. 28, 2022 (CN) ......................... 202211696594.5

(51) Int. Cl.
*G09G 3/20* (2006.01)
*G09G 3/28* (2013.01)
*G09G 3/36* (2006.01)

(52) U.S. Cl.
CPC ......... *G09G 3/2007* (2013.01); *G09G 3/2096* (2013.01); *G09G 3/2803* (2013.01);
(Continued)

(58) Field of Classification Search
CPC ..... G09G 2320/0271; G09G 2320/029; G09G 3/2007; G09G 3/2003; G09G 2320/0242; G09G 3/3607; G09G 2320/0626; G09G 2320/0276; G09G 2360/16; G09G 2320/0233; G09G 2320/0673; G09G 3/20; G09G 3/2803; G09G 2320/066;
(Continued)

(56) References Cited

U.S. PATENT DOCUMENTS 8,836,733 B2 * 9/2014 Lee ..................... G09G 3/3696 345/89
2005/0157921 A1 * 7/2005 Herron .................. G06K 15/02 382/162

(Continued)

*Primary Examiner* — Dismery Mercedes
(74) *Attorney, Agent, or Firm* — Anova Law Group, PLLC

(57) ABSTRACT

A display panel control method, a display mode of the display panel including a normal display mode and a partial highlight display mode, the control method including obtaining display information of a display area in the display panel in the partial highlight display mode, the display information including a grayscale displayed corresponding to each pixel, and a number of pixels displaying the corresponding grayscale; determining a target gamma curve based on the display information, a difference between a display brightness corresponding to the grayscale in the target gamma curve and a target display brightness required for the pixels to display the corresponding grayscale in the partial highlight display mode being within a predetermined range; and controlling the pixels in the display area to display based on the target gamma curve.

17 Claims, 11 Drawing Sheets

(52) U.S. Cl.
CPC ... *G09G 3/3607* (2013.01); *G09G 2320/0233* (2013.01); *G09G 2320/0271* (2013.01); *G09G 2320/0276* (2013.01); *G09G 2320/0626* (2013.01); *G09G 2320/0673* (2013.01); *G09G 2320/0686* (2013.01)

(58) Field of Classification Search
CPC ... G09G 2320/0295; G09G 2320/0666; G09G 2320/0686; G09G 5/02; G09G 2320/0646; G09G 3/2096; H04N 1/4078; H04N 23/841; H04N 5/202; H04N 9/69
See application file for complete search history.

(56) References Cited

U.S. PATENT DOCUMENTS

| | | | | |
|---|---|---|---|---|
| 2007/0252846 | A1* | 11/2007 | Ozawa | G09G 5/24 345/589 |
| 2008/0088858 | A1* | 4/2008 | Marcu | H04N 1/6086 358/1.6 |
| 2008/0180385 | A1* | 7/2008 | Yoshida | G09G 3/2074 345/87 |
| 2010/0156956 | A1* | 6/2010 | Madden | G09G 3/20 345/690 |
| 2011/0103685 | A1* | 5/2011 | Bhatt | G06T 5/92 382/167 |
| 2015/0181188 | A1* | 6/2015 | Higashi | H04N 25/135 348/223.1 |
| 2015/0294627 | A1* | 10/2015 | Yoo | H04M 1/72454 345/48 |
| 2015/0324961 | A1* | 11/2015 | Hu | G06T 5/50 382/264 |
| 2017/0084242 | A1* | 3/2017 | Kang | G09G 3/3685 |
| 2017/0134642 | A1* | 5/2017 | Yoshikawa | H04N 23/64 |
| 2018/0053290 | A1* | 2/2018 | Hu | G06T 5/50 |
| 2020/0051487 | A1* | 2/2020 | Peng | G09G 3/2007 |
| 2020/0344400 | A1* | 10/2020 | Matsuoka | H04N 23/71 |
| 2021/0150968 | A1* | 5/2021 | Chen | G09G 3/3406 |
| 2021/0264838 | A1* | 8/2021 | Park | G09G 3/3648 |
| 2023/0114963 | A1* | 4/2023 | Jun | G09G 5/06 345/601 |
| 2023/0353880 | A1* | 11/2023 | Kadoi | H04N 23/71 |

* cited by examiner

CONTROL METHOD AND CONTROL DEVICE FOR DISPLAY PANEL, STORAGE MEDIUM, AND ELECTRONIC DEVICE

CROSS-REFERENCE TO RELATED APPLICATION

This application claims priority of Chinese Patent Application No. 202211696594.5, filed on Dec. 28, 2022, the entire content of which is hereby incorporated by reference.

TECHNICAL FIELD

The present disclosure relates to the field of display technology and, more specifically, to a control method and a control device for a display panel, a storage medium, and an electronic device.

BACKGROUND

With increasing requirements of the appearance, color, and display usability of the display, the display technology continues to develop and progress. At present, the mainstream displays in the market mainly include liquid crystal displays, plasma displays, organic light-emitting diode displays, light-emitting diode displays, field emission displays, etc. The display of organic light-emitting diode (OLED) is an important display panel, which has excellent characteristics such as self-illumination, no need for backlight, wide color gamut, high contrast, thin, wide viewing angle, fast response speed, can be used for flexible panels, wide operating temperature range, simple structure and manufacturing process, etc.

However, at present, the voltage drop compensation and partial highlighting of the display panel cannot be achieved at the same time, and only a compromising operation scheme can be used during the working process of the display panel.

SUMMARY

One aspect of the present disclosure provides a control method for a display panel. The display mode of display panel includes a normal display mode and a partial highlight display mode. The control method includes in the partial highlight display mode, obtaining display information of a display area in the display panel, the display information including a grayscale displayed corresponding to each pixel, and a number of pixels displaying the corresponding grayscale; determining a target gamma curve based on the display information, a difference between a display brightness corresponding to the grayscale in the target gamma curve and a target display brightness required for the pixels to display the corresponding grayscale in the partial highlight display mode being within a predetermined range; and controlling the pixels in the display area to display based on the target gamma curve.

Another aspect of the present disclosure provides a control device for a display panel. The display mode of the display panel includes a normal display mode and a partial highlight display mode. The control device includes an acquisition module, the acquisition module being configured to acquire display information of a display area in the display panel in the partial highlight display mode, the display information including a grayscale displayed corresponding to each pixel, and a number of pixels displaying the corresponding grayscale; a determination module, the determination module being configured to determine a target gamma curve based on the display information, a difference between a display brightness corresponding to the grayscale in the target gamma curve and a target display brightness required for the pixels to display the corresponding grayscale in the partial highlight display mode being within a predetermined range; and a control module, the control module being configured to control the pixels in the display area to display based on the target gamma curve.

Another aspect of the present disclosure provides a computer-readable storage medium. The computer-readable storage medium stores program instructions, the program instructions are used to implement a control method for a display panel. The display mode of the display panel includes a normal display mode and a partial highlight display mode. The control method includes in the partial highlight display mode, obtaining display information of a display area in the display panel, the display information including a grayscale displayed corresponding to each pixel, and a number of pixels displaying the corresponding grayscale; determining a target gamma curve based on the display information, a difference between a display brightness corresponding to the grayscale in the target gamma curve and a target display brightness required for the pixels to display the corresponding grayscale in the partial highlight display mode being within a predetermined range; and controlling the pixels in the display area to display based on the target gamma curve.

Another aspect of the present disclosure provides an electronic device. The electronic device includes at least one processor, at least one memory connected to the at least one processor, and a bus. The at least one processor and the at least one memory are configured to communicate to each other through the bus. The at least one processor is configured to call a program instruction store in the at least one memory to obtain display information of a display area in a display panel in a partial highlight display mode, the display information including a grayscale displayed corresponding to each pixel, and a number of pixels displaying the corresponding grayscale; determine a target gamma curve based on the display information, a difference between a display brightness corresponding to the grayscale in the target gamma curve and a target display brightness required for the pixels to display the corresponding grayscale in the partial highlight display mode being within a predetermined range; and control the pixels in the display area to display based on the target gamma curve.

Consistent with the present disclosure, in the display panel control method provided by the embodiments of the present disclosure, when the display panel performs partial highlighting, the target gamma curve to be used can be determined based on the display information, and the pixels in the display area can be controlled based on the target gamma curve to adjust the brightness of the display area. The method of determining the target gamma curve based on the display information is more flexible, and adjusting the brightness through the target gamma curve does not depend on the voltage drop characteristics of the display panel. In this way, in the partial highlight display mode, the brightness of the partial highlight area is no longer limited by the voltage drop characteristics of the display panel. Therefore, when the voltage drop compensation function in the display panel is turned on such that the display panel can perform uniform display, the brightness of the partial highlight area will not be reduced, that is, the brightness of the partial highlight area in the partial highlight display mode can be improved. Therefore, the display panel control method can improve the brightness of the partial highlight area in the partial highlight display mode while ensuring the uniform display of the display panel.

In addition, in conventional technology, the maximum brightness in the partial highlight display mode is related to the voltage drop of the display panel, and the extent of the voltage drop after the display panel is manufactured is limited, which will also affect the further improvement of the brightness of the partial highlight area. In the display panel control method provided by the embodiments of the present disclosure, the brightness of the partial highlight area is determined based on the target gamma curve, and the brightness is no longer limited by the voltage drop characteristics of the display panel. In this way, when higher brightness is required in the partial highlight area, the brightness information can be represented in the display information, and this brightness information may also be included in the target gamma curve determined based on the display information. In this way, the brightness of the partial highlight area can be adjusted based on the target gamma curve, thereby further improving the brightness of the partial highlight area.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

The technical solutions provided by the embodiments of the present disclosure will be described clearly and completely as follow in conjunction with the drawings. It is apparent that the described embodiments are only a few rather than all of the embodiments according to the present disclosure. Any other embodiments obtained by those skilled in the art based on the embodiments in the present disclosure without any creative work fall in the scope of the present disclosure.

As described above, at present, the voltage drop compensation and partial highlighting of the display panel cannot be achieved at the same time, and only a compromising operation scheme can be used during the working process of the display panel.

Figure 1:
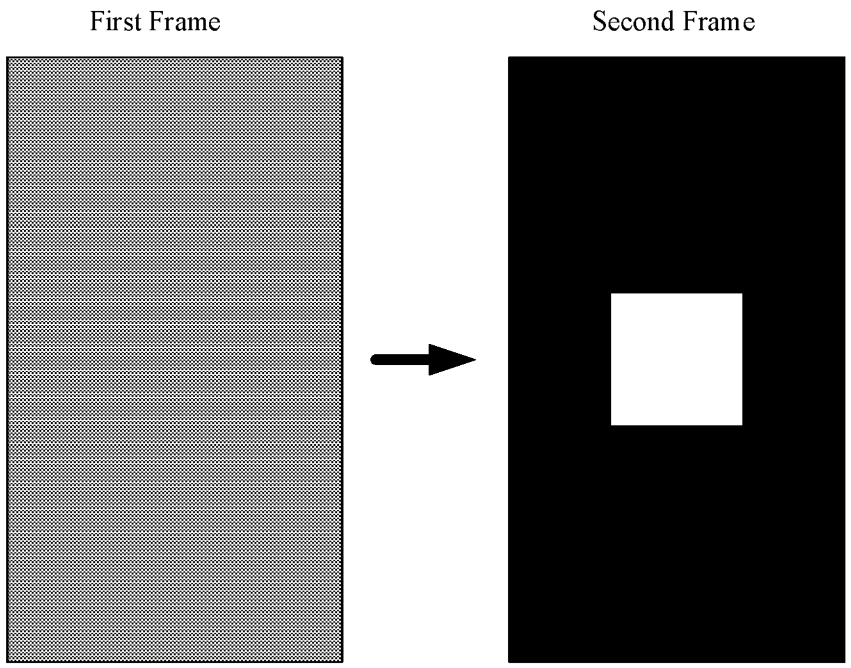
FIG. 1 is a schematic diagram of a display panel switching from a normal display mode to a partial highlight display mode.

FIG. 1 is a schematic diagram of a display panel switching from a normal display mode to a partial highlight display mode. After the display panel switches from the normal display mode to the partial highlight display mode, due to the voltage drop characteristics of the display panel itself, the display brightness of the partial highlight area is greater than the display brightness of other areas of the display panel. That is, the display brightness of the partial highlight area is directly proportionally to the voltage drop of the display panel, that is, a relatively large voltage drop is needed to realize the highlight display of the partial highlight area.

Figure 2:
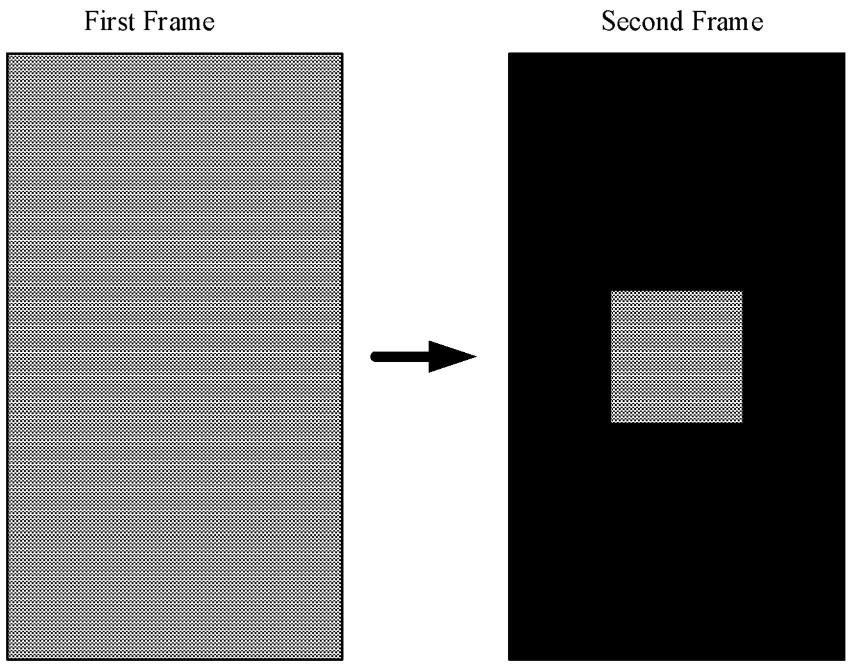
FIG. 2 is a schematic diagram of the display panel after performing voltage drop compensation in the partial highlight display mode.

FIG. 2 is a schematic diagram of the display panel after performing voltage drop compensation in the partial highlight display mode. Due to the voltage drop in the display panel, which affects the display uniformity of the display panel, in conventional technology, the voltage drop compensation function is generally used to reduce the voltage drop as much as possible to ensure the uniform display of the display panel. However, the voltage drop compensation function will reduce the brightness of the partial highlight area when the voltage drop is reduced.

That is, in conventional technology, the voltage drop compensation function is used to reduce the influence of the voltage drop on the display panel, but in the partial highlight display mode, a relatively large voltage drop is needed to achieve partial highlight display. Therefore, the two schemes are mutually exclusive and cannot be achieved at the same time. Therefore, in conventional technology, during the working process of the display panel, only one of the schemes can be selected or a compromising operation scheme can be selected.

Based on this, embodiments of the present disclosure provide a display panel control method, a display panel control device, a storage medium, and an electronic device. The display panel control method can be used to improve the brightness of the partial highlight area under the partial highlight display of the display panel while ensuring the display uniformity of the display panel.

In order to make the objectives, technical solutions, and advantages of the present disclosure more clear, the technical solutions in the embodiments of the present disclosure will be described below with reference to the drawings.

Figure 3:
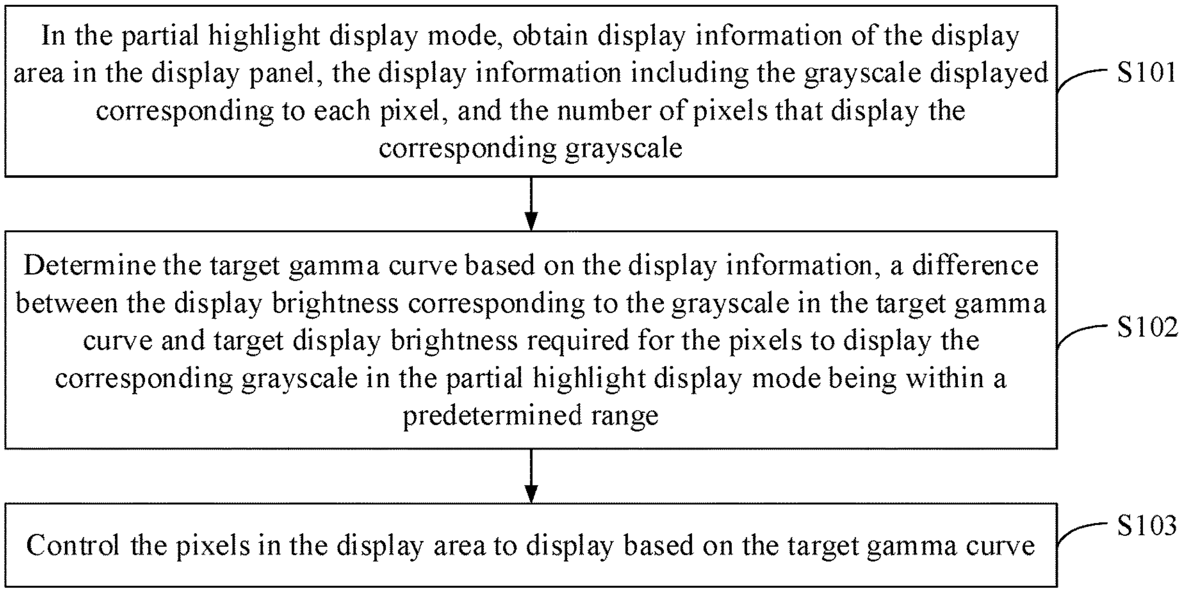
FIG. 3 is a flowchart of a display panel control method according to an embodiment of the present disclosure.

In the embodiments of the present disclosure, the display panel includes a normal display mode and a partial highlight display mode. FIG. 3 is a flowchart of a display panel control method according to an embodiment of the present disclosure. The control method will be described in detail below.

S101, in the partial highlight display mode, obtaining display information of a display area in the display panel, the display information including the grayscale displayed corresponding to each pixel, and the number of pixels that display the corresponding grayscale.

S102, determining a target gamma curve based on the display information, a difference between the display brightness corresponding to the grayscale in the target gamma curve and target display brightness required for the pixels to display the corresponding grayscale in the partial highlight display mode being within a predetermined range.

S103, controlling the pixels in the display area to display based on the target gamma curve.

More specifically, before controlling the display panel to display the next frame in the embodiments of the present disclosure, the integrated circuit (IC, the driver chip used to control the display panel to display) in the display panel may first obtain the display information of the entire display area in the next frame of the display panel. That is, to obtain the grayscale corresponding to each pixel in the entire display panel in the next frame, and the number of pixels that display the corresponding grayscale. Based on the obtained display information, the display area and display brightness of the next frame of the display panel can be determined.

The target gamma curve corresponding to the next frame displayed on the display panel may be determined based on the determined display area and display brightness of the next frame of the display panel, and the pixels in the display panel may be controlled to display based on the target gamma curve. In some embodiments, the difference between the display brightness corresponding to the grayscale in the target gamma curve and the target display brightness required for the pixel to display the corresponding grayscale in the partial highlight display mode may be within a predetermined range. Ideally, the display brightness corresponding to the grayscale in the target gamma curve is equal to the target display brightness required for the pixel to display the corresponding grayscale in the partial highlight display mode. For example, in the partial highlight display mode, the target display brightness required for a pixel to display the 255 grayscale may be 800 nit, then the gamma curve corresponding to the 255 grayscale corresponding to 800 nit may be determined as the target gamma curve; or, the target display brightness required for the pixel to display the 255 grayscale in the partial highlight display mode may be 1000 nit, then the gamma curve corresponding to the 255 grayscale corresponding to 100 nit may be determined as the target gamma curve.

In order to better understand the display panel control method provided by the embodiments of the present disclosure, the display panel control method described above will be described in detail below with an example.

In conventional technology, as shown in FIG. 1, when the first frame is displayed, the brightness of the pixels displaying the 255 grayscale may be 500 nit. Due to the voltage drop of the display panel, when the second frame is displayed, the pixels in the partial highlight area display the brightness of the 255 grayscale may be 600 nit. In order to ensure uniform display of the display panel, a voltage drop compensation operation is needed. At this time, when the second frame is displayed, the brightness of the pixels displaying the 255 grayscale in the partial highlight area will be reduced, for example, to 550 nit.

Obviously, after the voltage drop compensation operation is completed, the maximum brightness of the partial highlight display becomes 500 nit. Therefore, in conventional technology, the schemes of the voltage drop compensation scheme and the partial highlight scheme of the display panel are mutually exclusive and cannot be achieved at the same time. Therefore, in the conventional technology, in the working process of the display panel, only one of the schemes can be selected or a compromising operation scheme can be selected to either ensure the uniform display of the display panel, or perform partial highlighting or reduce the extent of the voltage drop compensation. For example, when the second frame is displayed, the brightness of 600 nit of the pixels displaying the 255 grayscale in the partial highlight area may be adjusted to 580 nit.

In the display panel control method provided by the embodiments of the present disclosure, in the normal display mode, the gamma curve corresponding to the 255 grayscale and 500 nit can still be used. After switching from the normal display mode to the partial highlight display mode, in the target gamma curve determined based on the display information, the 255 grayscale may correspond to 600 nit. When the display panel displays based on the target gamma curve, the brightness of the 255 grayscale displayed in the partial highlight area can be 600 nit. Since the method of improving the brightness of the partial highlight area in the technical solution of the present disclosure is no longer based on voltage drop, but based on the selected target gamma curve for brightness adjustment, when the voltage drop is compensated, the display brightness of the partial highlight area can be maintained at 600 nit without being reduced, which is effectively increased by 50 nit compared with the conventional technology.

It can be seen from the above description that in the display panel control method provided by the embodiments of the present disclosure, when the display panel performs partial highlighting, the target gamma curve to be used can be determined based on the display information, and the pixels in the display area can be controlled based on the target gamma curve to adjust the brightness of the display area. The method of determining the target gamma curve based on the display information is more flexible, and adjusting the brightness through the target gamma curve does not depend on the voltage drop characteristics of the display panel. In this way, in the partial highlight display mode, the brightness of the partial highlight area is no longer limited by the voltage drop characteristics of the display panel. Therefore, when the voltage drop compensation function in the display panel is turned on such that the display panel can perform uniform display, the brightness of the partial highlight area will not be reduced, that is, the brightness of the partial highlight area in the partial highlight display mode can be improved. Therefore, the display panel control method can improve the brightness of the partial highlight area in the partial highlight display mode while ensuring the uniform display of the display panel.

In addition, in conventional technology, the maximum brightness in the partial highlight display mode is related to the voltage drop of the display panel, and the extent of voltage drop after the display panel is manufactured is limited, which will also affect the improvement of the brightness of the partial highlight area. In the display panel control method provided by the embodiments of the present disclosure, the brightness of the partial highlight area can be determined based on the target gamma curve, and the brightness is no longer limited by the voltage drop characteristics of the display panel. In this way, when higher brightness is required in the partial highlight area, the brightness information can be represented in the display information, and this brightness information may also be included in the target gamma curve determined based on the display information. In this way, the brightness of the partial highlight area can be adjusted based on the target gamma curve, thereby further improving the brightness of the partial highlight area.

It should be noted that after the voltage drop compensation function is turned on, the display uniformity of the display panel described above may refer to the display uniformity of other areas in the display panel except for the partial highlight area, or the display uniformity between each partial highlight area when there are multiple partial highlight areas with the same brightness in the display panel.

Figure 4:
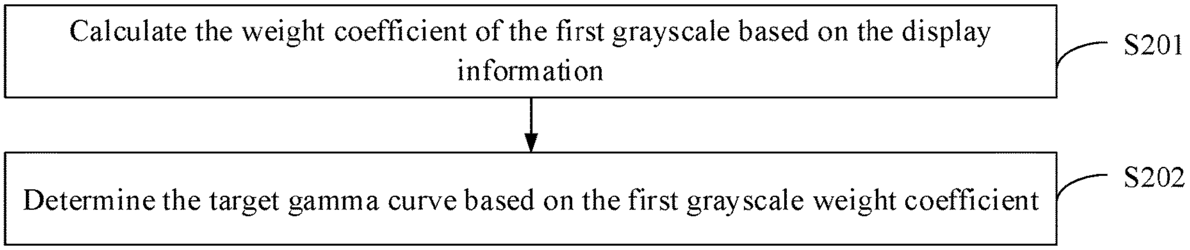
FIG. 4 is another flowchart of a display panel control method according to an embodiment of the present disclosure.

FIG. 4 is another flowchart of a display panel control method according to an embodiment of the present disclosure. More specifically, the process at S102, determining the target gamma curve based on the display information, may be implemented as follow.

S201, calculating the weight coefficient of the first grayscale based on the display information, the weight coefficient of the first grayscale being $G_{APL}$, $$G_{APL} = \sum_{i=1}^{255}\left(k_i * \frac{i}{N_i}\right),$$

where i indicates the grayscale, $k_i$ indicates the grayscale coefficient of the grayscale, and $N_i$ indicates the number of pixels displaying the grayscale i in the display area.

S202, determining the target gamma curve based on the first grayscale weight coefficient.

More specifically, in the embodiments of the present disclosure, $0<k_i\leq 1$ and $k_i<k_2<k_3 \ldots <k_{255}$ Before controlling the display panel to display the next frame, the IC in the display panel may first obtain the display information of the entire display area in the next frame of the display panel, that is, obtain the grayscale corresponding to each pixel in the entire display panel of the next frame, and the number of pixels that display the corresponding grayscale. The first grayscale weight coefficient may be calculated based on the importance of pixels displaying different grayscales and the number of pixels corresponding to grayscales relative to the entire display area. That is, the calculated first grayscale weight coefficients of different values may represent display areas and display brightness of different areas, and then used to characterize and determine the display area and display brightness of the next frame of the display panel. Therefore, the method of determining the target gamma curve based on the first grayscale weight coefficient is more accurate, and the method of calculating the first grayscale weight coefficient is relatively simple, which will not introduce calculation burden to the IC in the display panel.

It should be understood that when calculating the weight coefficient of the first grayscale, if the number $N_i$ of pixels corresponding to a certain grayscale is 0, that is, there is no pixel displayed in this grayscale in the panel, then substituting $N_i=0$ into the calculation will cause this item to be infinite. Therefore, a threshold can be set in advance. During calculation, IC may discard items greater than the threshold and not include them in the final summation operation to ensure the rationality of the calculation results. In addition, the threshold may be selected and set based on actual needs. For example, the threshold may be set to 1, and the IC may discard items greater than 1 during calculation.

Figure 5:
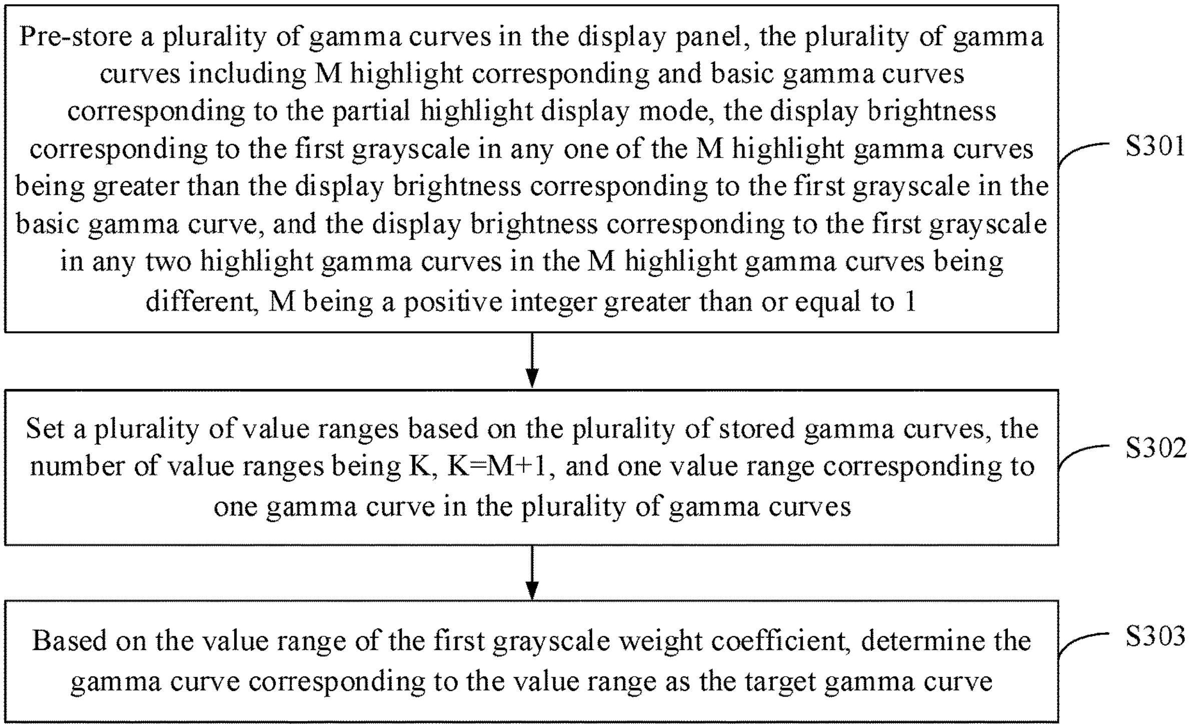
FIG. 5 is another flowchart of a display panel control method according to an embodiment of the present disclosure.

FIG. 5 is another flowchart of a display panel control method according to an embodiment of the present disclosure. More specifically, the process at S1022, determining the target gamma curve based on the first grayscale weight coefficient, may be implemented as follow.

S301, pre-storing a plurality of gamma curves in the display panel, the plurality of gamma curves including M highlight corresponding and basic gamma curves corresponding to the partial highlight display mode, the display brightness corresponding to the first grayscale in any one of the M highlight gamma curves being greater than the display brightness corresponding to the first grayscale in the basic gamma curve, and the display brightness corresponding to the first grayscale in any two highlight gamma curves in the M highlight gamma curves being different, M being a positive integer greater than or equal to 1.

S302, setting a plurality of value ranges based on the plurality of stored gamma curves, the number of value ranges being K, K=M+1, and one value range corresponding to one gamma curve in the plurality of gamma curves.

S303, based on the value range of the first grayscale weight coefficient, determining the gamma curve corresponding to the value range as the target gamma curve.

Figure 6:
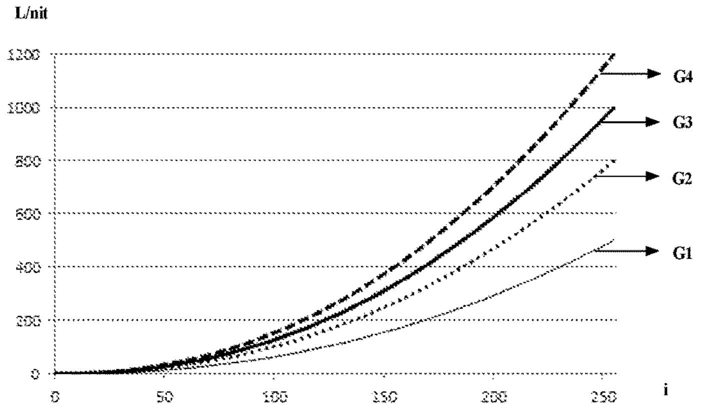
FIG. 6 is a schematic diagram of a plurality of gamma curves according to an embodiment of the present disclosure.

Refer to FIG. 6, which is a schematic diagram of a plurality of gamma curves according to an embodiment of the present disclosure. FIG. 6 takes four gamma curves as an example for illustration. In FIG. 6, the abscissa represents the grayscale i, and the ordinate represents the brightness L. Two of the gamma curves are highlight gamma curves (the G3 curve and the G4 curve), that is, M=2. The brightness corresponding to the 255 grayscale in the two highlight gamma curves is 1000 nit and 1200 nit respectively, and the brightness corresponding to the 255 grayscale in the partial highlight display mode corresponding to the basic gamma curve (the G2 curve) is 800 nit. It should be noted that the brightness corresponding to the grayscale in the plurality of gamma curves may be determined based on actual conditions, which is not limited in the embodiments of the present disclosure.

It should also be noted that the display panel also stores a gamma curve (the G1 curve) corresponding to the normal display mode, where brightness corresponding to the 255 grayscale in the gamma curve corresponding to the normal display mode is 500 nit.

Figure 7:
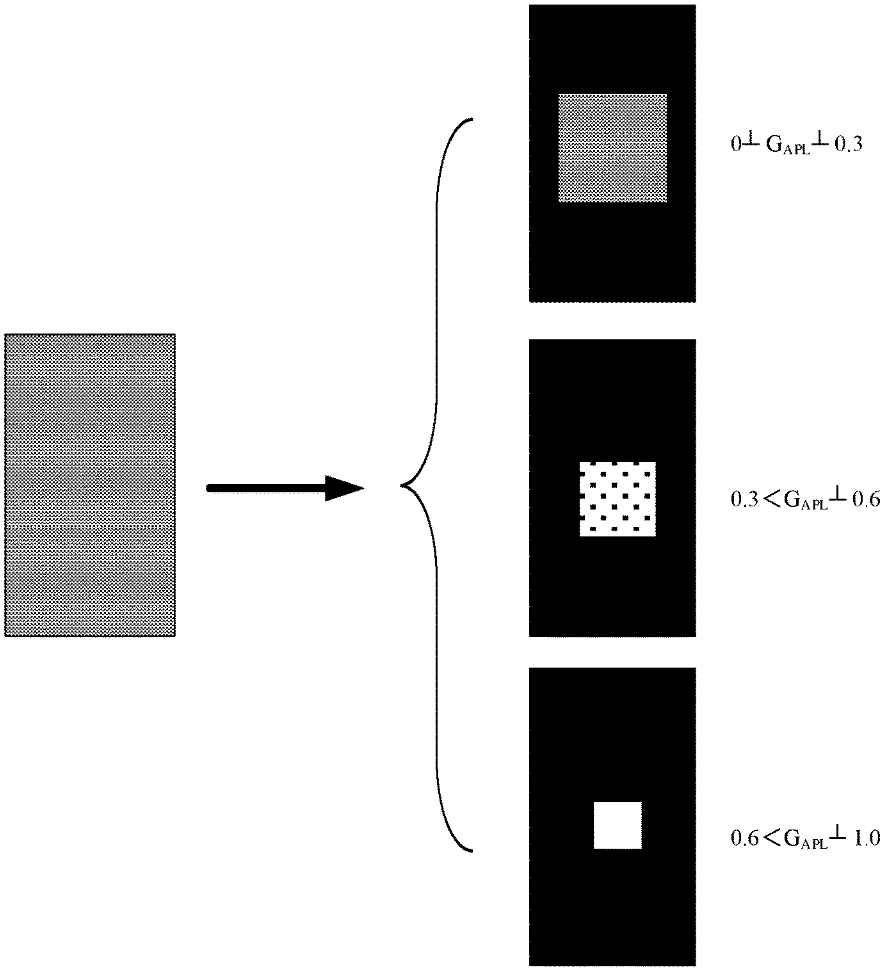
FIG. 7 is a schematic diagram of a comparison of display information corresponding to a first grayscale weight coefficient in different numerical ranges according to an embodiment of the present disclosure.

FIG. 7 is a schematic diagram of a comparison of display information corresponding to a first grayscale weight coefficient in different numerical ranges according to an embodiment of the present disclosure. Based on the above description, the calculated first grayscale weight coefficients of different values may represent different areas of the display area and display brightness. Based on this, in the embodiments of the present disclosure, a plurality of value ranges may be set based on the plurality of stored gamma curves, and one value range may correspond to one gamma curve in the plurality of gamma curves. As shown in FIG. 7, three value ranges are set. The three value ranges being $0 \le G_{APL} \le 0.3$, $0.3 < G_{APL} \le 0.6$, and $0.6 < G_{APL} \le 1.0$. When the calculated first grayscale weight coefficient is within the value range of $0 \le G_{APL} \le 0.3$, the area of the corresponding first display area may be A, and the display brightness may be a. When the calculated first grayscale weight coefficient is within the value range of $0.3 < G_{APL} \le 0.6$, the area of the corresponding first display area may be B, and the display brightness may be b. When the calculated first grayscale weight coefficient is within the value range of $0.6 < G_{APL} \le 1.0$, the area of the corresponding first display area may be C, and the display brightness may be c, where A>B>C, and a<b<c.

When the calculated first grayscale weight coefficient is within the value range of $0 \le G_{APL} \le 0.3$, the area of the first display area when the next frame of the display panel is partially displayed may be relatively large, however, compared with the display, it is also a partial display, but in the case of a relatively large partial display area, a better can be achieved without particularly high brightness. Therefore, a highlight gamma curve with a brightness of 800 nit corresponding to the 255 grayscale can be used to control the pixels in the display area for display.

When the calculated first grayscale weight coefficient is within the value range of $0.3 < G_{APL} \le 0.6$, the area of the first display area when the next frame of the display panel is partially displayed may be relatively moderate, that is, the area of the partially displayed area may be further reduced. At this time, when the display area is relatively moderate, the display brightness needs to be appropriately increased. Therefore, it is a highlight gamma curve with a brightness of 1000 nit corresponding to the 255 grayscale can be used to control the pixels in the display area for display.

When the calculated first grayscale weight coefficient is within the value range of $0.6 < G_{APL} \le 1.0$, the area of the first display area when the next frame of the display panel is partially displayed may be relatively small, that is, the area of the partially displayed area may be further reduced. In order to ensure a good display, the display brightness needs to be increased to a relatively large extent when the display area is relatively small. Therefore, a highlight gamma curve with a brightness of 1200 nit corresponding to the 255 grayscale can be used to control the pixels in the display area to realize the highlight display of a relatively small area.

In the display panel control method provided by the embodiments of the present disclosure, a plurality of highlight gamma curves to be used in the partial highlight display mode and a basic gamma curve can be pre-stored in the display panel, a plurality of value ranges can be set based on these pre-stored gamma curves, and the value ranges may correspond to the pre-stored gamma curves in a one-to-one relationship. In this way, after calculating the first grayscale weight coefficient, the corresponding value range of the first grayscale weight coefficient can be determined, thereby determining a gamma curve as the target gamma curve. That is, the control method provided by the embodiments of the present disclosure can accurately determine the target gamma curve from a plurality of gamma curves based on the value range of the first grayscale weight coefficient. Further, compared with the situation where only one gamma curve can be used for adjustment, the control method described above can also realize diversified adjustment of the brightness of the display panel, which is beneficial to further improving the display brightness of the partial highlight area in the partial highlight display mode.

It should be noted that in the foregoing embodiment, only three value ranges are used as an example for illustration. In some other embodiments of the present disclosure, the number of value ranges can be increased or decreased based on actual situation.

Figure 8:
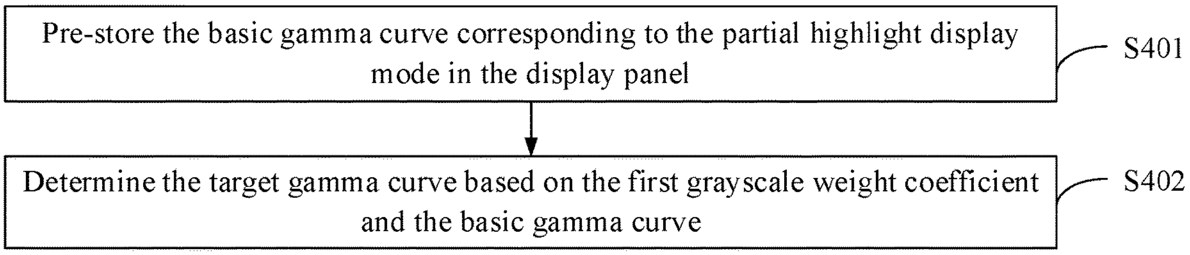
FIG. 8 is another flowchart of a display panel control method according to an embodiment of the present disclosure.

FIG. 8 is another flowchart of a display panel control method according to an embodiment of the present disclosure. More specifically, the process at S1022, determining the target gamma curve based on the first grayscale weight coefficient, may be implemented as follow.

S401, pre-storing the basic gamma curve corresponding to the partial highlight display mode in the display panel.

S402, determining the target gamma curve based on the first grayscale weight coefficient and the basic gamma curve.

More specifically, considering the IC storage cost in the display panel, in some embodiments, there may be no need to pre-store a plurality of highlight gamma curves required in the partial highlight display mode in the IC of the display panel, and only one basic gamma curve corresponding to the partial highlight display mode and one gamma curve corresponding to the normal display mode may be stored.

Therefore, the calculated first grayscale weight coefficient may be used as a gain value, and the data corresponding to the target gamma curve may be determined based on the basic gamma curve. In some embodiments, based on the first grayscale weight coefficient and the basic gamma curve, the target gamma curve may be determined by multiplying the brightness corresponding to each grayscale on the basic gamma curve by the first grayscale weight coefficient to obtain the target gamma curve. In this way, different first grayscale weight coefficients combined with the pre-stored basic gamma curves can obtain different target gamma curve data corresponding to different first grayscale weight coefficients, and the pixels in the display area can be controlled to display based on the obtained data of the target gamma curve.

That is, in the embodiments of the present disclosure, under the condition that the dynamic adjustment of the brightness of the partial highlight display mode can be realized, the storage cost of the IC can also be reduced and the operating speed of the IC can be improved. In addition, the first grayscale weight coefficient can be used as the gain value, different gain values can be used to obtain the target gamma curve of different data, which is equivalent to being able to divide the value range infinitely, such that the determined target gamma curve is more accurate.

Figure 9:
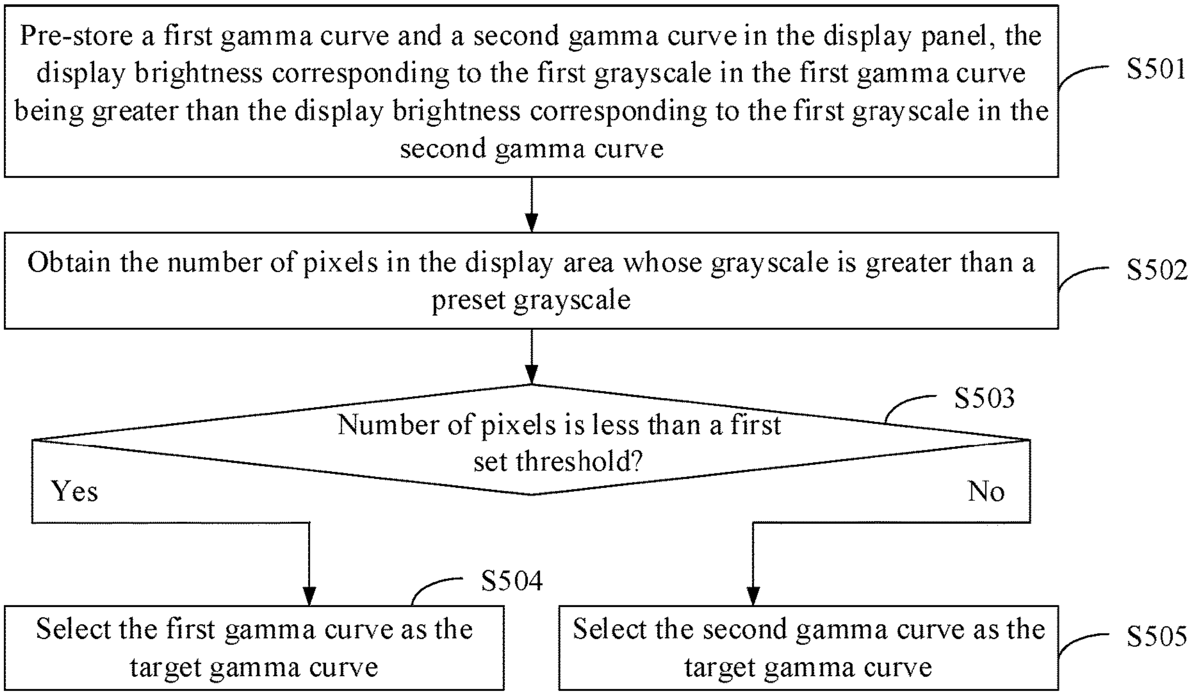
FIG. 9 is another flowchart of a display panel control method according to an embodiment of the present disclosure.

FIG. 9 is another flowchart of a display panel control method according to an embodiment of the present disclosure. More specifically, the process at S102, determining the target gamma curve based on the display information, may be implemented as follow.

S501, pre-storing a first gamma curve and a second gamma curve in the display panel, the display brightness corresponding to the first grayscale in the first gamma curve being greater than the display brightness corresponding to the first grayscale in the second gamma curve.

S502, obtaining the number of pixels in the display area whose grayscale is greater than a preset grayscale.

S503, determining whether the number of pixels is smaller than a first set threshold.

S504, if the number of pixels is less than the first set threshold, selecting the first gamma curve as the target gamma curve.

S505, if the number of pixels is greater than or equal to the first set threshold, selecting the second gamma curve as the target gamma curve.

More specifically, in the embodiments of the present disclosure, only two gamma curves may need to be pre-stored in the IC of the display panel, that is, the first gamma curve and the second gamma curve. The display brightness corresponding to the first grayscale in the first gamma curve may be greater than the display brightness corresponding to the first grayscale in the second gamma curve. For example, the display brightness corresponding to the 255 grayscale in the first gamma curve may be 1000 nit, and the display brightness corresponding to the 255 grayscale in the second gamma curve may be 500 nit.

It should be noted that in the embodiments of the present disclosure, the preset grayscale may be the 180 grayscale as an example, and the display panel may have 10,000 pixels as an example, and the first set threshold may be 5,000 as an example.

Subsequently, the number of pixels in the display area whose grayscale is greater than the preset grayscale may be obtained, such as obtaining the number of pixels in the display area whose grayscale is greater than the 180 grayscale. When the number of pixels obtained is less than 5,000, it is considered that the display panel will enter the partial highlight display mode for partial highlight display. At this time, the first gamma curve can be used as the target gamma curve to control the display of pixels in the display area, thereby improving the brightness in the partial highlight display mode. Conversely, when the number of pixels obtained is greater than or equal to 5,000, it is considered that the display panel does not need to enter the partial highlight display mode for partial highlight display. At this time, the second gamma curve can be used as the target gamma curve to control the pixels in the display area to display normally.

That is, in this embodiment, there is no need to calculate the first grayscale weight coefficient of the pixels, and only the number of pixels whose grayscale displayed by the pixels is greater than the preset grayscale needs to be generally counted. Further, whether the display panel needs to enter the partial highlight display mode for partial highlight display can be determined based on the set first set threshold. If the display panel needs to enter the partial highlight display mode for partial highlight display, the highlight target gamma curve can be selected to control the display of pixels. This technical solution is relatively simple and easy to implement.

Figure 10:
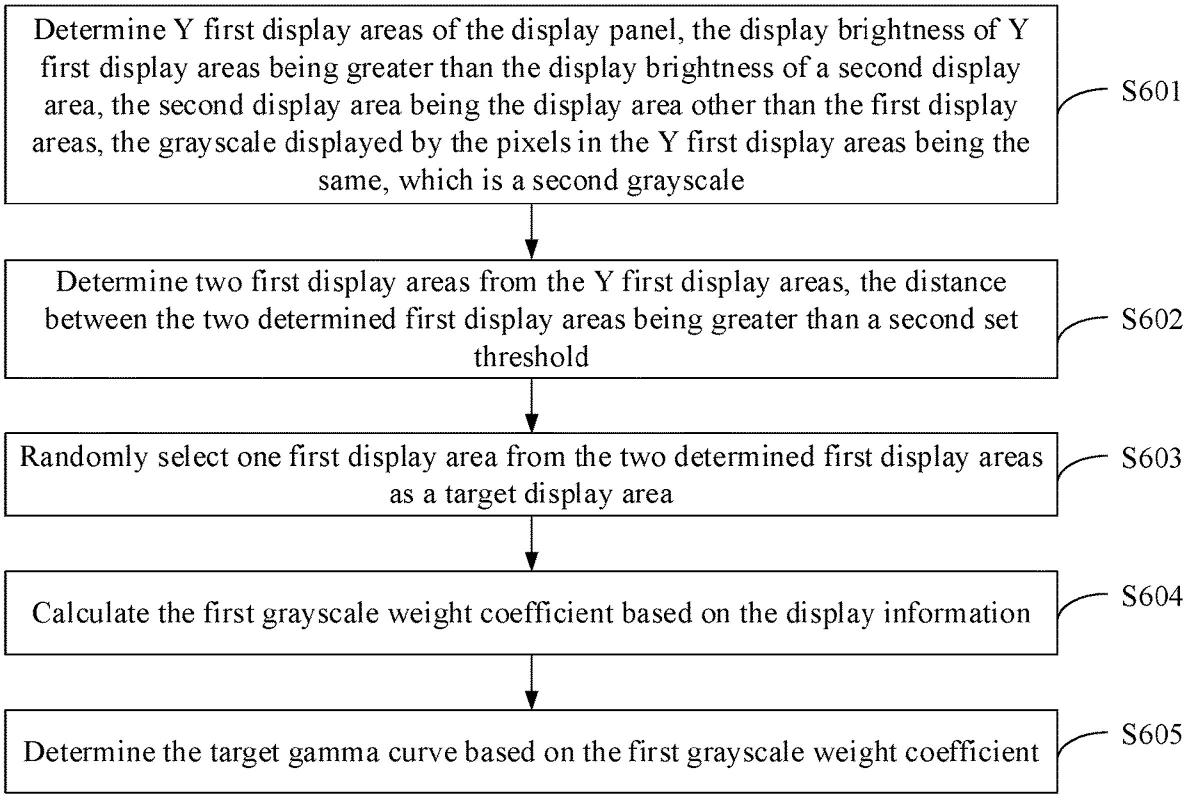
FIG. 10 is another flowchart of a display panel control method according to an embodiment of the present disclosure.

FIG. 10 is another flowchart of a display panel control method according to an embodiment of the present disclosure. More specifically, the process at S102, determining the target gamma curve based on the display information, may also be implemented as follow.

S601, determining Y first display areas of the display panel, the display brightness of Y first display areas being greater than the display brightness of a second display area, the second display area being the display area other than the first display areas, the grayscale displayed by the pixels in the Y first display areas being the same, which is a second grayscale.

S602, determining two first display areas from the Y first display areas, the distance between the two determined first display areas being greater than a second set threshold.

S603, randomly selecting one first display area from the two determined first display areas as the target display area.

S604, calculating the first grayscale weight coefficient based on the display information, the first grayscale weight coefficient being $G_{APL}$, $$G_{APL} = \sum_{i=1}^{255}\left(k_i * \frac{i}{N_i}\right),$$

where i represents the grayscale, $k_i$ represents the grayscale coefficient of the grayscale, when i is not the second grayscale, $N_i$ represents the number of pixels displaying the grayscale i; when i is the second grayscale, $N_i$ represents the number of pixels displaying the grayscale i in the target display area.

S605, determining the target gamma curve based on the first grayscale weight coefficient.

Figure 11:
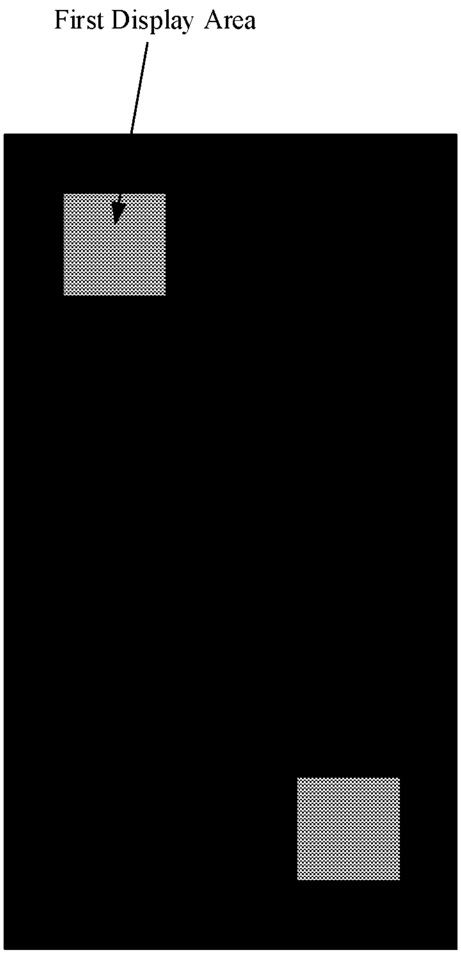
FIG. 11 is a schematic diagram of a display area on the display panel according to an embodiment of the present disclosure.

Refer to FIG. 11, which is a schematic diagram of a display area on the display panel according to an embodiment of the present disclosure. In FIG. 11, two first display areas are taken as an example, that is, Y=2 is taken as an example for illustration. All display areas except for the first display areas in the display area may be defined as the second display area. Since the display brightness of the first display areas may be greater than the display brightness of the second display area, that is, the first display areas may be understood as the partial highlight areas in the partial highlight display mode. Further, the grayscale displayed by the pixels in the Y first display areas may be the same, which may be the second grayscale. That is, the brightness displayed by the Y first display areas may be the same, which may be Y color blocks of the same brightness.

Considering the viewing angle of the user, when the distance between the two first display areas on the display panel is relatively far, such as shown in FIG. 11, where one of the first display areas is located at the upper left corner of the display panel, and the other first display areas is located at the lower right corner of the display panel, in this case, the user cannot view the two first display areas at the same time when viewing. That is, the user can only use one of the first display areas as the target display area to read information. Therefore, the actual effective area of the partial highlight area in the partial highlight display mode is only the area of one of the two first display areas.

If the sum of the two first display areas is used as the actual effective partial highlight area in the partial highlight display mode, it is obvious that when calculating the weight coefficient of the first grayscale and counting the number of pixels displaying the second grayscale, the sum of the number of pixels displaying the second grayscale in the two first display areas are being counted. Compared with only counting the number of pixels displaying the second grayscale in one of the first display areas, there are more pixels displaying the second grayscale when two first display areas are being counted. Based on the formula of the first grayscale weight coefficient, it can be seen that the obtained first grayscale weight coefficient will become smaller, and the area of the partial highlight area represented by the first grayscale weight coefficient is the sum of the areas of the two first display areas. Therefore, the brightness corresponding to the 255 grayscale in the selected target gamma curve is also low. For example, the brightness corresponding to the 255 grayscale in the selected target gamma curve may be 800 nit, which shows that it does not meet the actual application needs of the user.

Therefore, in the embodiments of the present disclosure, when there are a plurality of first display areas as the partial highlight area, the distance between any two first display areas can be determined. When the distance between the two first display areas is greater than the second set threshold, it may indicate that the user cannot view the two first display areas at the same time when viewing. That is, the user can only use one of the first display areas as the target display area to read information. At this time, a first display area can be randomly selected from the two first display areas as the target display area.

Therefore, when counting the number of pixels displaying the second grayscale when calculating the weight coefficient of the first grayscale, the number of pixels displaying the second grayscale in one of the first display areas may be counted, that is, the number of pixels displaying the second grayscale in the target display area may be counted. Compared with the sum of the number of pixels displaying the second grayscale in the two first display areas, the number of pixels displaying the second grayscale will decrease. Based on the formula of the first grayscale weight coefficient, it can be seen that the obtained first grayscale weight coefficient will increase. The area of the partial highlight area represented by the first grayscale weight coefficient may be the area of the target display area. In addition, the brightness corresponding to the 255 grayscale in the selected target gamma curve may also increase. For example, the brightness corresponding to the 255 grayscale in the selected target gamma curve may be 1000 nit, and the display can meet the actual application needs of the user at this time, and effectively realize the highlight display of a small area, that is, the highlight display can be satisfied when viewing any first display area.

That is, in the embodiments of the present disclosure, the actual situation of user's viewing angle is taken into account, therefore, the target gamma curve meeting the actual needs can be more reasonable determined, and the pixels in the display area can be controlled to display based on the target gamma curve thereby improving the display effect in the partial highlight display mode.

Figure 12:
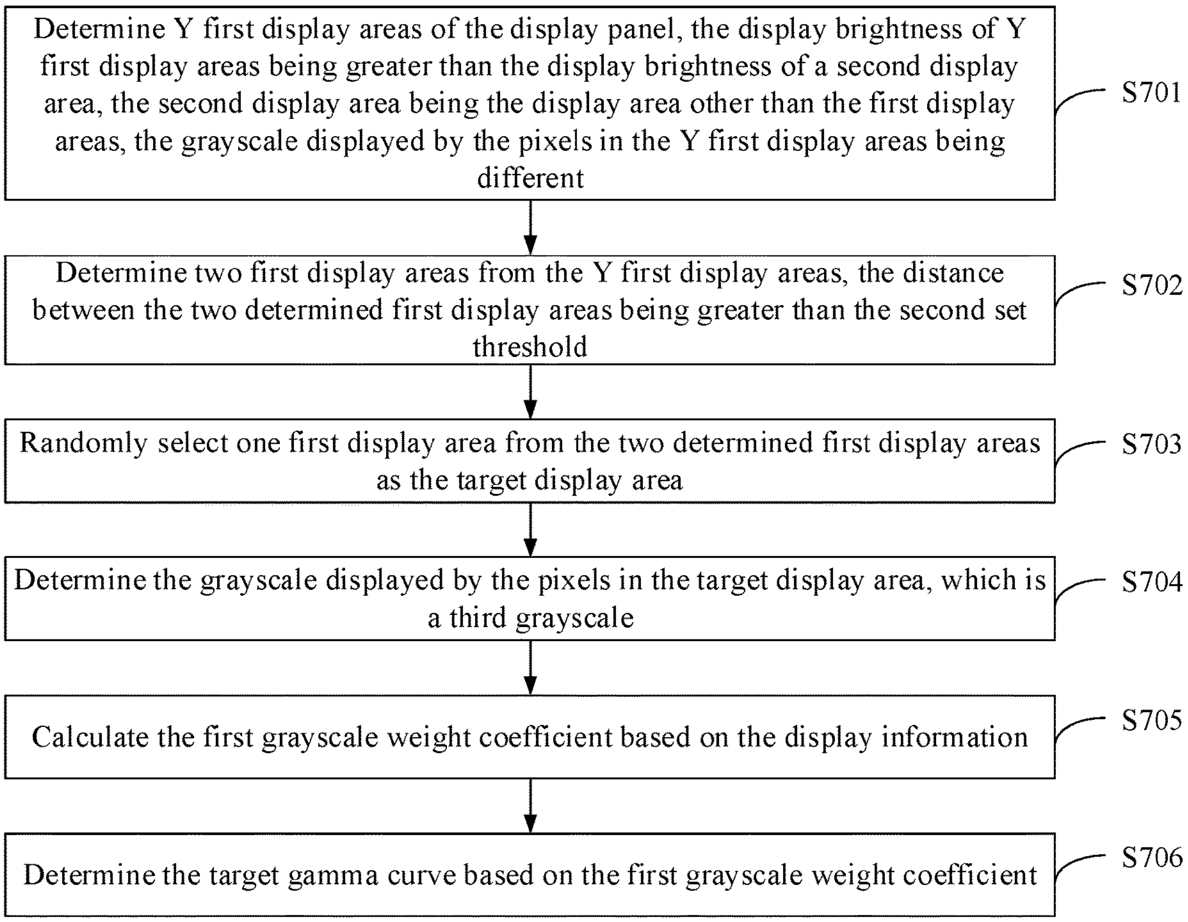
FIG. 12 is another flowchart of a display panel control method according to an embodiment of the present disclosure.

FIG. 12 is another flowchart of a display panel control method according to an embodiment of the present disclosure. More specifically, the process at S102, determining the target gamma curve based on the display information, may also be implemented as follow.

S701, determining Y first display areas of the display panel, the display brightness of Y first display areas being greater than the display brightness of a second display area, the second display area being the display area other than the first display areas, the grayscale displayed by the pixels in the Y first display areas being different.

S702, determining two first display areas from the Y first display areas, the distance between the two determined first display areas being greater than the second set threshold.

S703, randomly selecting one first display area from the two determined first display areas as the target display area.

S704, determining the grayscale displayed by the pixels in the target display area, which is a third grayscale.

S705, calculating the first grayscale weight coefficient based on the display information, the first grayscale weight coefficient being $G_{APL}$, $$G_{APL}=\sum_{i=1}^{255}\left(k_i*\frac{i}{N_i}\right),$$

where i represents the grayscale, $k_i$ represents the grayscale coefficient of the grayscale, when i is not the third grayscale, $N_i$ represents the number of pixels displaying the grayscale i; when i is the third grayscale, $N_i$ represents the number of pixels displaying the grayscale i in the target display area.

S706, determining the target gamma curve based on the first grayscale weight coefficient.

More specifically, refer to FIG. 11, two first display areas are taken as an example. That is, Y=2 is taken as an example for illustration. All display areas except for the first display areas in the display area may be defined as the second display area. Since the display brightness of the first display areas may be greater than the display brightness of the second display area, that is, the first display areas may be understood as the partial highlight areas in the partial highlight display mode. Further, the grayscale displayed by the pixels in the Y first display areas may be the different. For example, the grayscale displayed by the pixels in one of the first display areas may be the 120 grayscale, and the grayscale displayed by the pixels in the other first display area may be the 210 grayscale. That is, the Y first display areas may display different brightness, which are Y color blocks with different brightness.

Considering the viewing angle of the user, when the distance between the two first display areas on the display panel is relatively far, such as shown in FIG. 11, where one of the first display areas is located at the upper left corner of the display panel, and the other first display areas is located at the lower right corner of the display panel, in this case, the user cannot view the two first display areas at the same time when viewing. That is, the user can only use one of the first display areas as the target display area to read information. Therefore, the actual effective area of the partial highlight area in the partial highlight display mode is only the area of one of the two first display areas.

Therefore, in the embodiments of the present disclosure, when there are a plurality of first display areas as the partial highlight area, the distance between any two first display areas can be determined. When the distance between the two first display areas is greater than the second set threshold, it may indicate that the user cannot view the two first display areas at the same time when viewing. That is, the user can only use one of the first display areas as the target display area to read information. At this time, a first display area can be randomly selected from the two first display areas as the target display area.

Therefore, when counting the number of pixels displaying the third grayscale when calculating the weight coefficient of the first grayscale, only the number of pixels displaying the third grayscale in the target display area may be counted. The area of the partial highlight area represented by the first grayscale weight coefficient calculated at this time may be the area of the target display area. The determined target gamma curve may also be relatively in line with the actual viewing situation of the user, such that the display can meet the actual application needs of the user at this time, and effectively realize the highlight display of a small area.

After the target gamma curve is determined, the brightness of different first display areas may be adjusted based on the target gamma curve. For example, if the grayscale displayed by the pixels in a first display area is the 120 grayscale, then the brightness of the first display area may be set to the brightness corresponding to the 120 grayscale on the target gamma curve; and if the grayscale displayed by the pixels in the other first display area is the 210 grayscale, then the brightness of the first display area may be set to the brightness corresponding to the 210 grayscale on the target gamma curve.

That is, in the embodiments of the present disclosure, the actual situation of user's viewing angle is taken into account, therefore, the target gamma curve meeting the actual needs can be more reasonable determined, and the pixels in the display area can be controlled to display based on the target gamma curve thereby improving the display effect in the partial highlight display mode.

Figure 13:
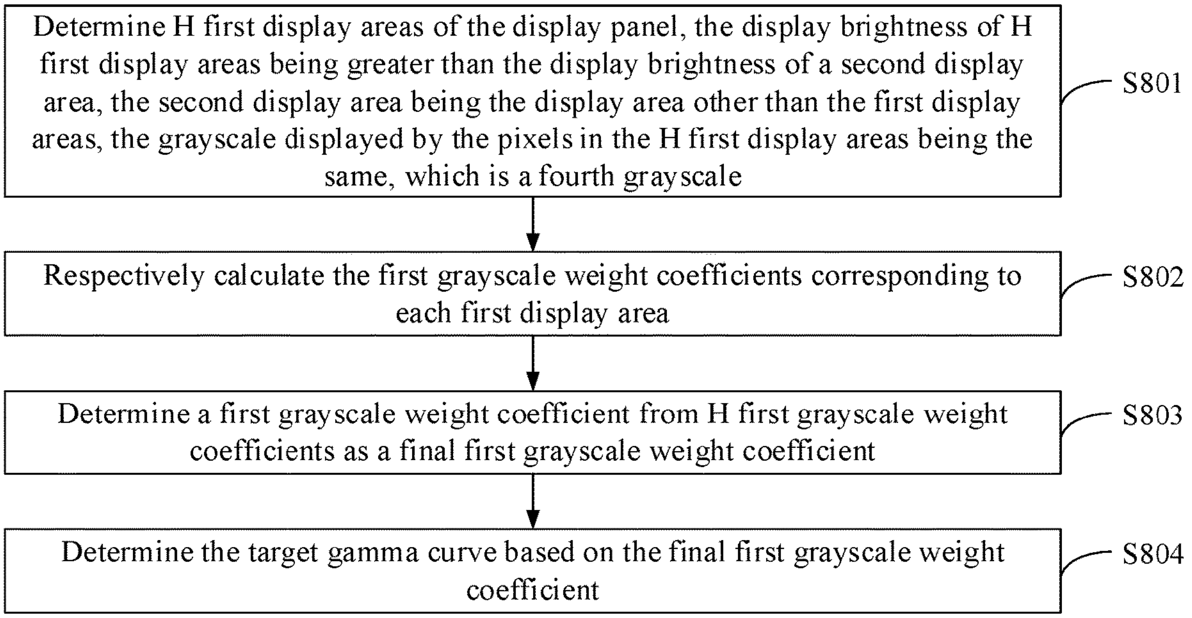
FIG. 13 is another flowchart of a display panel control method according to an embodiment of the present disclosure.

FIG. 13 is another flowchart of a display panel control method according to an embodiment of the present disclosure. More specifically, the process at S102, determining the target gamma curve based on the display information, may also be implemented as follow.

S801, determining H first display areas of the display panel, the display brightness of H first display areas being greater than the display brightness of a second display area, the second display area being the display area other than the first display areas, the grayscale displayed by the pixels in the H first display areas being the same, which is a fourth grayscale.

S802, respectively calculating the first grayscale weight coefficients corresponding to each first display area to obtain H first grayscale weight coefficients $G_{APL}$, $$G_{APL} = \sum_{i=1}^{255}\left(k_i * \frac{i}{N_i}\right),$$

where i represents the grayscale, $k_i$ represents the grayscale coefficient of the grayscale, when i is not the fourth grayscale, $N_i$ represents the number of pixels displaying the grayscale i; when i is the fourth grayscale, $N_i$ represents the number of pixels displaying the grayscale i in the target display area.

S803, determining a first grayscale weight coefficient from H first grayscale weight coefficients as a final first grayscale weight coefficient.

S804, determining the target gamma curve based on the final first grayscale weight coefficient.

More specifically, refer to FIG. 11, two first display areas are taken as an example. That is, H=2 is taken as an example for illustration. All display areas except for the first display areas in the display area may be defined as the second display area. Since the display brightness of the first display areas may be greater than the display brightness of the second display area, that is, the first display areas may be understood as the partial highlight areas in the partial highlight display mode. Further, the grayscale displayed by the pixels in the H first display areas may be the same, which may be the fourth grayscale. That is, the brightness displayed by the H first display areas may be the same, which may be H color blocks of the same brightness.

Subsequently, the first grayscale weight coefficient corresponding to each first display area may be calculated. For example, when counting the number of pixels displaying the fourth grayscale when calculating the first grayscale weight coefficient of the first-occurring first display area, on the number of pixels displaying the fourth grayscale in the first-occurring first display area may be counted, and the number of pixels displaying other grayscales may be counted normally based on the display area.

In this way, H first grayscale weight coefficients may be obtained. Based on the H first grayscale weight coefficients, for example, processing such as averaging, selecting a mode, or selecting a maximum value to determine a first grayscale weight coefficient as the final first grayscale weight coefficient may be performed. The target gamma curve may be determined based on the final first grayscale weight coefficient, and the pixels in the display area may be controlled to display based on the target gamma curve. In this way, the situation where some first display areas with a smaller area are too bright and some first display areas with a larger area are too dark can be avoided. The brightness of the H first display areas can be equalized, thereby improving the display effect of the display panel in the partial highlight display mode.

Figure 14:
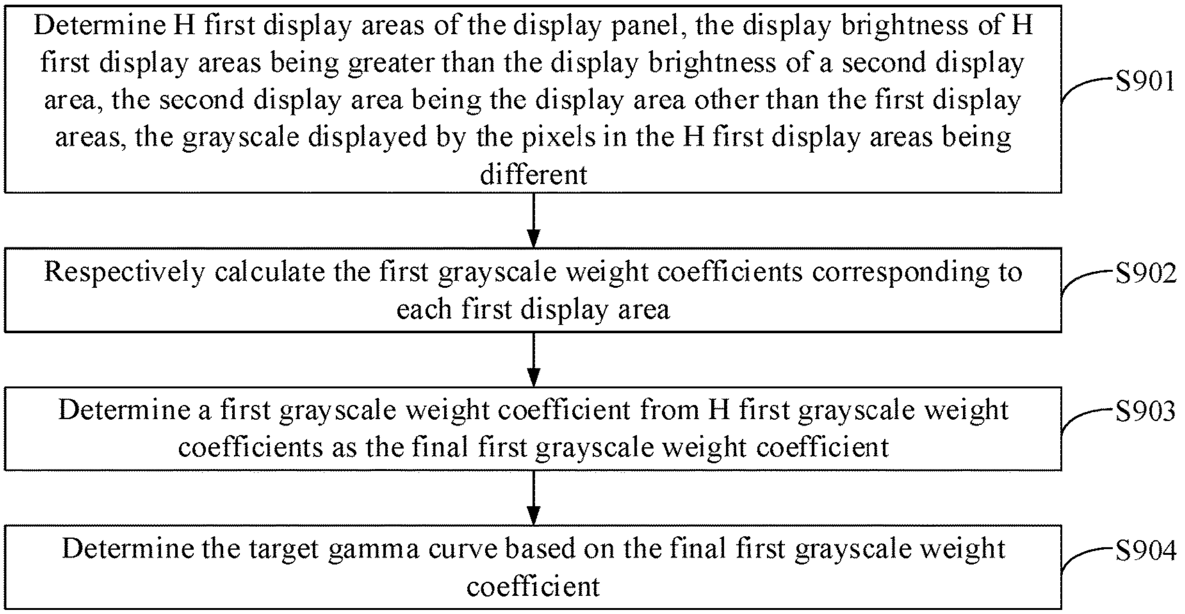
FIG. 14 is another flowchart of a display panel control method according to an embodiment of the present disclosure.

FIG. 14 is another flowchart of a display panel control method according to an embodiment of the present disclosure. More specifically, the process at S102, determining the target gamma curve based on the display information, may also be implemented as follow.

S901, determining H first display areas of the display panel, the display brightness of H first display areas being greater than the display brightness of a second display area, the second display area being the display area other than the first display areas, the grayscale displayed by the pixels in the H first display areas being different.

S902, respectively calculating the first grayscale weight coefficients corresponding to each first display area to obtain H first grayscale weight coefficients $G_{APL}$, $$G_{APL} = \sum_{i=1}^{255}\left(k_i * \frac{i}{N_i}\right),$$

where i represents the grayscale, $k_i$ represents the grayscale coefficient of the grayscale, when i is not the grayscale displayed by the pixels in the first display area currently calculated, $N_i$ represents the number of pixels displaying the grayscale in the display area; when i is the grayscale displayed by the pixels in the first display area currently calculated, $N_i$ represents the number of pixels displaying the grayscale in the currently calculated first display area.

S903, determining a first grayscale weight coefficient from H first grayscale weight coefficients as a final first grayscale weight coefficient.

S904, determining the target gamma curve based on the final first grayscale weight coefficient.

More specifically, refer to FIG. 11, two first display areas are taken as an example. That is, H=2 is taken as an example for illustration. All display areas except for the first display areas in the display area may be defined as the second display area. Since the display brightness of the first display areas may be greater than the display brightness of the second display area, that is, the first display areas may be understood as the partial highlight areas in the partial highlight display mode. Further, the grayscale displayed by the pixels in the H first display areas may be the different. For example, the grayscale displayed by the pixels in one of the first display areas may be the 120 grayscale, and the grayscale displayed by the pixels in the other first display area may be the 210 grayscale. That is, the H first display areas may display different brightness, which are H color blocks with different brightness.

Subsequently, the first grayscale weight coefficient corresponding to each first display area may be calculated. When counting the number of pixels displaying the grayscale and the grayscale is the grayscale displayed by the pixels in the currently calculated first display area, only the number of pixels displaying the grayscale in the current calculated first display area may be counted, and the number of pixels displaying other grayscales may be counted normally based on the display area.

In this way, H first grayscale weight coefficients may be obtained. Based on the H first grayscale weight coefficients, for example, processing such as averaging, selecting a mode, or selecting a maximum value to determine a first grayscale weight coefficient as the final first grayscale weight coefficient may be performed. The target gamma curve may be determined based on the final first grayscale weight coefficient, and the pixels in the display area may be controlled to display based on the target gamma curve. In this way, the situation where some first display areas with a smaller area are too bright and some first display areas with a larger area are too dark can be avoided. The brightness of the H first display areas can be equalized, thereby improving the display effect of the display panel in the partial highlight display mode.

Figure 15:
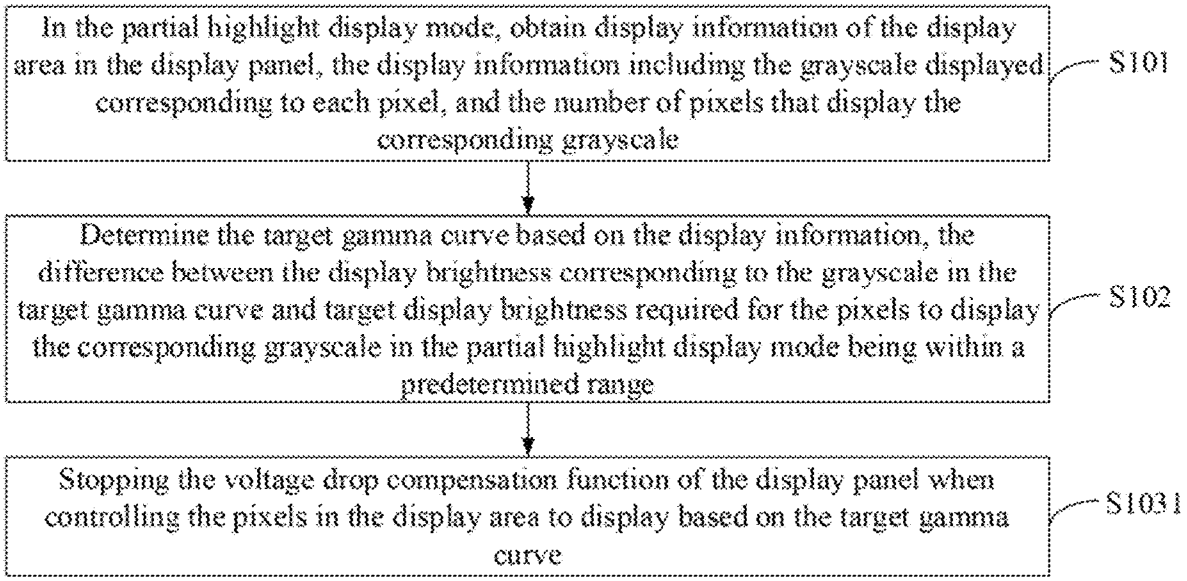
FIG. 15 is another flowchart of a display panel control method according to an embodiment of the present disclosure.

FIG. 15 is another flowchart of a display panel control method according to an embodiment of the present disclosure. More specifically, the process at S103, controlling the pixels in the display area to display based on the target gamma curve, may also be implemented as follow.

S1031, stopping the voltage drop compensation function of the display panel when controlling the pixels in the display area to display based on the target gamma curve.

More specifically, in the display panel control method provided by the embodiments of the present disclosure, if it is determined that the 255 grayscale in the target gamma curve determined based on the display information corresponds to 800 nit, then when the display panel displays based on the target gamma curve, the brightness of the pixels displaying the 255 grayscale may be 800 nit. If the display is switched to display the partial highlight area, based on the characteristics of the display panel, the brightness of the pixels displayed the 255 grayscale in the partial highlight area may also be automatically increased, for example, automatically increased to 1000 nit. If the voltage drop compensation operation is not performed at this time, then 1000 nit is the maximum brightness of the partial highlight area in the partial highlight display mode in this technical solution. Compared with the 600 nit in the conventional technology, the brightness of the partial highlight display mode in the partial highlight display mode is improved.

If the voltage drop compensation operation is performed at the same time, the maximum brightness of the partial highlight area in the partial highlight display mode becomes 800 nit after the voltage drop compensation operation is completed. At this time, 800 nits is the maximum brightness of the partial highlight area in the partial highlight display mode in this technical solution.

Therefore, in the embodiments of the present disclosure, when the pixels in the display area are controlled to display based on the target gamma curve, stopping the voltage drop compensation function of the display panel can further improve the brightness of the display panel in the partial highlight display mode.

Figure 16:
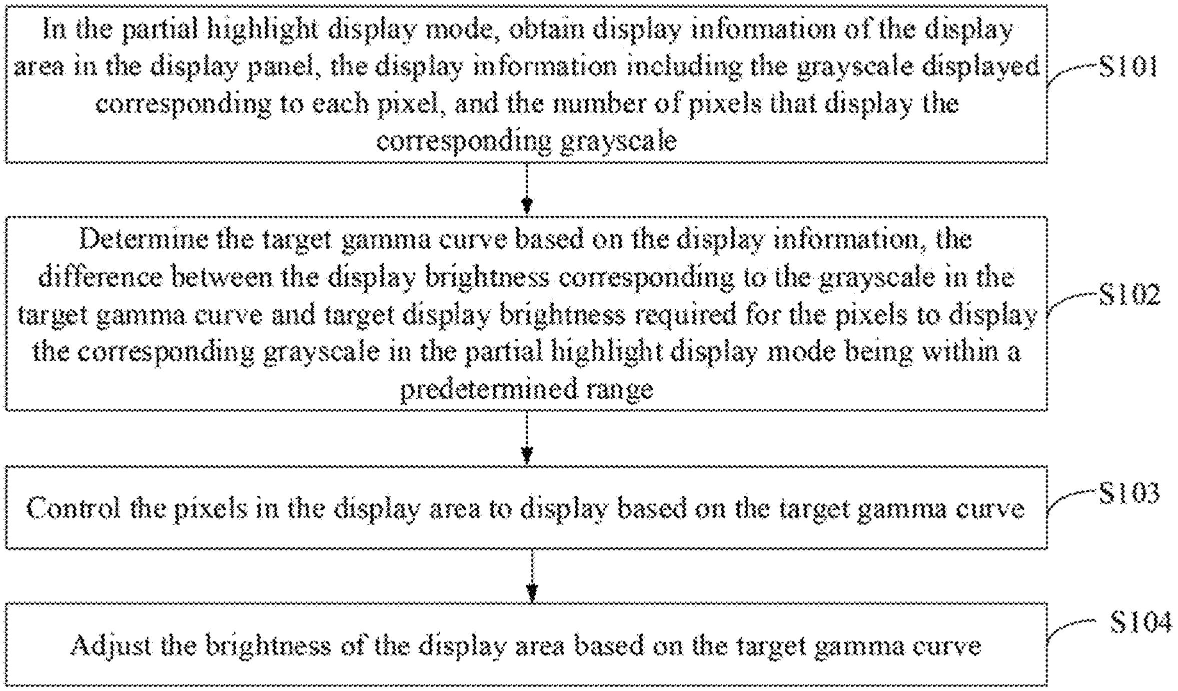
FIG. 16 is another flowchart of a display panel control method according to an embodiment of the present disclosure.

FIG. 16 is another flowchart of a display panel control method according to an embodiment of the present disclosure. In some embodiments, after controlling the pixels in the display area to display based on target gamma curve, the control method may further include the following process.

S104, adjusting the brightness of the display area based on the target gamma curve.

More specifically, in the embodiments of the present disclosure, due to the voltage drop on the display panel, the brightness of pixels in different areas may vary even when they display the same grayscale at the same time. Therefore, in the embodiments of the present disclosure, the brightness of the pixels in the display area can also be adjusted based on the determined target gamma curve to ensure the display effect of the display panel and ensure that the pixels displaying the same grayscale have the same brightness.

Figure 17:
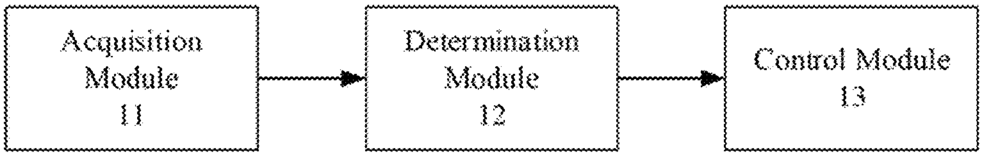
FIG. 17 is a schematic structural diagram of a display pane control device according to an embodiment of the present disclosure.

Based on the same inventive concept, an embodiment of the present disclosure also provides a display panel control device, which can be used to implement the display panel control method described in the foregoing embodiments. Refer to FIG. 17, which is a schematic structural diagram of a display pane control device according to an embodiment of the present disclosure. The display mode of the display panel may include the normal display mode and the partial highlight display mode, and the control device may include an acquisition module 11, a determination module 12, and the control module 13. The acquisition module 11 may be configured to acquire the display information of the display area in the display panel in the partial highlight display mode, the display information may include the grayscale corresponding to each pixel, and the number of pixels displaying the corresponding grayscale. The determination module 12 may be configured to determine the target gamma curve based on the display information. The difference between the display brightness corresponding to the grayscale in the target gamma curve and the target display brightness required for the pixels to display the corresponding grayscale in the partial highlight display mode may be within a predetermined range. The control module 13 may be configured to control the pixels in the display area to display based on the target gamma curve.

More specifically, in the embodiments of the present disclosure, in the partial highlight display mode, the display information of the display area in the display panel may be obtained. The display information may include the grayscale displayed corresponding to each pixels, and the number of pixels that display the corresponding grayscale. Further, the target gamma curve may be determined based on the display information, and the difference between the display brightness in the target gamma curve and the target display brightness required for the pixels to display the corresponding grayscale in the partial highlight display mode may be within a predetermined range. Furthermore, the pixels in the display area may be controlled to display based on the target gamma curve. The display panel control device can not only ensure the uniform display of the display panel, but also improve the brightness of the partial highlight area in the partial highlight display mode.

In some embodiments, the determination module 12 may include a calculation unit. The calculation unit may be configured to calculate the first grayscale weight coefficient based on the display information. The weight coefficient of the first grayscale may be represented by $G_{APL}$, $$G_{APL} = \sum_{i=1}^{255}\left(k_i * \frac{i}{N_i}\right),$$

where i indicates the grayscale, $k_i$ indicates the grayscale coefficient of the grayscale, and $N_i$ indicates the number of pixels displaying the grayscale i in the display area.

In some embodiments, the determination module 12 may further include a determination unit. The determination unit may be configured to determine the target gamma curve based on the first grayscale weight coefficient.

More specifically, the determination unit may be configured to pre-store a plurality of gamma curves in the display panel. The plurality of gamma curves may include M highlight gamma curves and a basic gamma curve corresponding to the partial highlight display mode. The display brightness corresponding to the first grayscale in any one of the M highlight gamma curves may be greater than the display brightness corresponding to the first grayscale in the basic gamma curve. In addition, the display brightness corresponding to the first grayscale of any two highlight gamma curves in the M highlight gamma curves may be different, and M may be a positive integer greater than or equal to 1. The determination unit may also be configured to set a plurality of value ranges based on the plurality of stored gamma curves, the number of the value range being K, K=M+1, and one value range corresponding to one gamma curve in the plurality of gamma curves; and, based on the value range of the first grayscale weight coefficient, use the gamma curve corresponding to the value range as the target gamma curve.

Alternatively, the determination unit may be configured to pre-store the basic gamma curve corresponding to the partial highlight display mode in the display panel; and, determine the target gamma curve based on the first grayscale weight coefficient and the basic gamma curve.

It should be noted that the principle of the control device provided in the embodiments of the present disclosure is the same as that of the control method provided in the foregoing embodiments of the present disclosure, which will not be repeated here.

An embodiment of the present disclosure further provides a computer-readable storage medium. The computer-readable storage medium stored computer-executable instructions, and the computer-executable instructions can be used to execute the display panel control method described in the foregoing embodiments.

Figure 18:
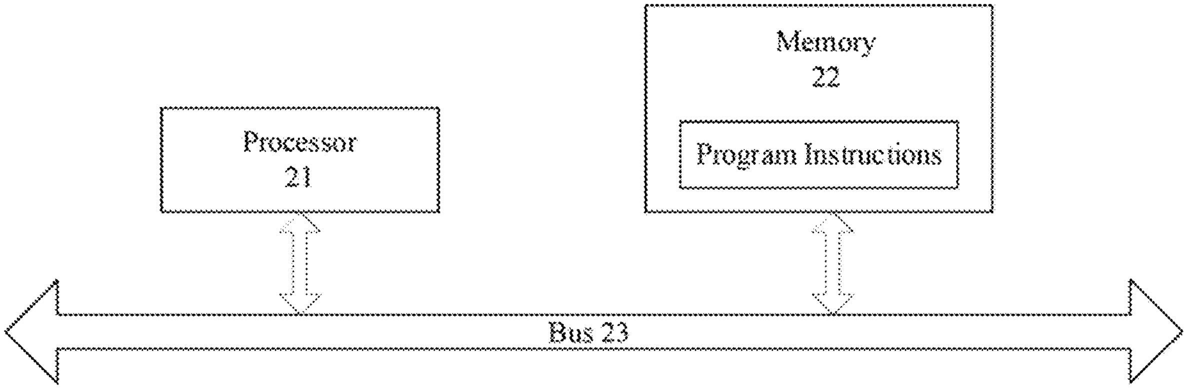
FIG. 18 is a schematic diagram of a hardware architecture of an electronic device according to an embodiment of the present disclosure.

An embodiment of the present disclosure further provides an electronic device. Refer to FIG. 18, which is a schematic diagram of a hardware architecture of an electronic device according to an embodiment of the present disclosure.

The electronic device may include at least one processor 21, at least one memory 22 connected to the at least one processor 21, and a bus 23.

In some embodiments, the processor 21 and the memory 22 may communicate with each other through the bus 23.

In some embodiments, the processor 21 may be configured to call the program instructions in the memory 22 to execute the display panel control method described in the foregoing embodiments.

The technical solutions provided by the present disclosure are described in detail above. The principle and implementation of the present disclosure are described herein using specific examples. The above description of the embodiments is merely for helping in understanding the method and the core ideas of the present disclosure. At the same time, those skilled in the art can change the specific embodiments and application scopes of the disclosure, based on the idea of the present disclosure. Therefore, the contents of the specification are not intended to limit the scope of the disclosure.

Various embodiments in the present disclosure are described in a progressive manner. Each embodiment may focus on the differences from other embodiments, and same or similar parts between various embodiments may be referred to each other. The apparatuses disclosed in various embodiments correspond to the methods disclosed in various embodiments, the description of the apparatuses may be relatively simple, and relevant parts may refer to the description of method embodiments.

It should be noted that the relationship terms used in the text of this application, such as first and second, are only for distinguishing an object or operation from another object or operation, but not for defining or implying any practical relation or order between the object or operation. The terms "include", "contain" or other alternatives shall be non-exclusiveness, the inclusion of a series of element such as process, method, object or equipment shall include not only the already mentioned elements but also those elements not mentioned, and shall include the elements which are inherent in the process, method, object or equipment. However, under the condition of no more limitations, the definition of an essential element limited by the sentence "including a . . . " shall not obviate that in addition to containing the said essential element in the process, method, object or equipment, other essential element of the same nature may also exist in the above-mentioned process, method, object or equipment.

The above description of disclosed embodiments enables those skilled in the art to implement or use the present disclosure. Various modifications to these embodiments may be obvious to those skilled in the art, and the general principles defined herein may be implemented in other embodiments without departing from the spirit or scope of the present disclosure. Therefore, the present disclosure may not be limited to various embodiments shown in the present disclosure but should conform to the widest scope consistent with the principles and novel features disclosed in the present disclosure.

What is claimed is:

1. A control method for a display panel, a display mode of the display panel including a normal display mode and a partial highlight display mode, the control method comprising:

in the partial highlight display mode, obtaining display information of a display area in the display panel, the display information including a grayscale corresponding to each pixel to be displayed in a next frame, and a number of pixels to display each corresponding grayscale;

determining a target gamma curve based on the display information including the grayscale corresponding to each pixel to be displayed and the number of pixels to display each corresponding grayscale; and controlling pixels in the display area to display based on the target gamma curve, wherein a difference between a display brightness corresponding to each grayscale in the determined target gamma curve and a target display brightness required for pixels to display each corresponding grayscale in the partial highlight display mode is within a predetermined range.

2. The control method according to claim 1, wherein determining the target gamma curve based on the display information includes:

calculating a first grayscale weight coefficient based on the display information, the first grayscale weight coefficient being $G_{APL}$, $$G_{APL} = \sum_{i=1}^{255}\left(k_i * \frac{i}{N_i}\right),$$

where i indicates a grayscale, $k_i$ indicates a grayscale coefficient of the grayscale, and $N_i$ indicates the number of pixels displaying the grayscale i in the display area; and determining the target gamma curve based on the first grayscale weight coefficient.

3. The control method according to claim 2, wherein determining the target gamma curve based on the first grayscale weight coefficient includes:

pre-storing a plurality of gamma curves in the display panel, the plurality of gamma curves including M highlight gamma curves and a basic gamma curve corresponding to the partial highlight display mode, a display brightness corresponding to a first grayscale in any one of the M highlight gamma curves being greater than a display brightness corresponding to the first grayscale in the basic gamma curve, a display brightness corresponding to a first grayscale of any two highlight gamma curves in the M highlight gamma curves being different, M being a positive integer greater than or equal to 1;

setting a plurality of value ranges based on the plurality of pre-stored gamma curves, a quantity of the value ranges being K, K=M+1, and one value range corresponding to one gamma curve in the plurality of gamma curves; and based on a value range of the first grayscale weight coefficient, using a gamma curve corresponding to the value range of the first grayscale weight coefficient as the target gamma curve.

4. The control method according to claim 2, wherein determining the target gamma curve based on the first grayscale weight coefficient includes:

pre-storing the basic gamma curve corresponding to the partial highlight display mode in the display panel; and determining the target gamma curve based on the first grayscale weight coefficient and the basic gamma curve.

5. The control method according to claim 4, wherein determining the target gamma curve based on the first grayscale weight coefficient and the basic gamma curve includes:

obtaining the target gamma curve by multiplying a display brightness corresponding to each grayscale on the basic gamma curve by the first grayscale weight coefficient respectively.

6. The control method according to claim 1, wherein determining the target gamma curve based on the display information includes:

pre-storing a first gamma curve and a second gamma curve in the display panel, a display brightness corresponding to a first grayscale in the first gamma curve being greater than the display brightness corresponding to the first grayscale in the second gamma curve;

obtaining a number of pixels whose grayscale displayed by the pixels in the display area is greater than a preset grayscale;

determining whether the number of pixels is less than a first set threshold;

if the number of pixels is less than the first set threshold, selecting the first gamma curve as the target gamma curve, if the number of pixels is greater than or equal to the first set threshold, selecting the second gamma curve as the target gamma curve.

7. The control method according to claim 1, wherein determining the target gamma curve based on the display information includes:

determining a number Y of first display areas of the display panel, a display brightness of the number Y of first display areas being greater than a display brightness of a second display area, the second display area being a display area other than the first display areas in the display panel, a grayscale displayed by pixels in the number Y of first display areas being the same, which is a second grayscale;

determining two first display areas from the number Y of first display areas, a distance between the two determined first display areas being greater than a second set threshold;

randomly selecting one first display area from the two determined first display areas as a target display area;

calculating a first grayscale weight coefficient based on the display information, the first grayscale weight coefficient being $G_{APL}$, $$G_{APL} = \sum_{i=1}^{255}\left(k_i * \frac{i}{N_i}\right),$$

where i represents a grayscale, $k_i$ represents a grayscale coefficient of the grayscale, when i is not the second grayscale, $N_i$ represents the number of pixels displaying the grayscale i; when i is the second grayscale, $N_i$ represents the number of pixels displaying the grayscale i in the target display area; and determining the target gamma curve based on the first grayscale weight coefficient.

8. The control method according to claim 1, wherein determining the target gamma curve based on the display information includes:

determining a number Y of first display areas of the display panel, a display brightness of the number Y of first display areas being greater than a display brightness of a second display area, the second display area being a display area other than the first display areas in the display panel, grayscales displayed by pixels in the number Y of first display areas being different;

determining two first display areas from the number Y of first display areas, a distance between the two determined first display areas being greater than a second set threshold;

randomly selecting one first display area from the two determined first display areas as a target display area;

determining a grayscale displayed by pixels in the target display area as a third grayscale;

calculating a first grayscale weight coefficient based on the display information, the first grayscale weight coefficient being $G_{APL}$, $$G_{APL} = \sum_{i=1}^{255}\left(k_i * \frac{i}{N_i}\right),$$

where i represents a grayscale, $k_i$ represents a grayscale coefficient of the grayscale, when i is not the third grayscale, $N_i$ represents the number of pixels displaying the grayscale i; when i is the third grayscale, $N_i$ represents the number of pixels displaying the grayscale i in the target display area;

determining the target gamma curve based on the first grayscale weight coefficient.

9. The control method according to claim 1, wherein determining the target gamma curve based on the display information includes:

determining a number H of first display areas of the display panel, a display brightness of the number H of first display areas being greater than a display brightness of a second display area, the second display area being a display area other than the first display areas, a grayscale displayed by the pixels in the number H of first display areas being the same, which is a fourth grayscale;

respectively calculating a first grayscale weight coefficient corresponding to each first display area to obtain a number H of first grayscale weight coefficients $G_{APL}$, $$G_{APL}=\sum_{i=1}^{255}\left(k_i*\frac{i}{N_i}\right),$$

where i represents a grayscale, $k_i$ represents a grayscale coefficient of the grayscale, when i is not the fourth grayscale, $N_i$ represents the number of pixels displaying the grayscale i; when i is the fourth grayscale, $N_i$ represents the number of pixels displaying the grayscale i in a target display area;

determining a first grayscale weight coefficient from the number H of first grayscale weight coefficients as a final first grayscale weight coefficient; and determining the target gamma curve based on the final first grayscale weight coefficient.

10. The control method according to claim 1, wherein determining the target gamma curve based on the display information includes:

determining a number H of first display areas of the display panel, a display brightness of the number H of first display areas being greater than a display brightness of a second display area, the second display area being a display area other than the first display areas, a grayscale displayed by pixels in the number H of first display areas being different;

respectively calculating a first grayscale weight coefficient corresponding to each first display area to obtain a number H of first grayscale weight coefficients $G_{APL}$, $$G_{APL}=\sum_{i=1}^{255}\left(k_i*\frac{i}{N_i}\right),$$

where i represents a grayscale, $k_i$ represents a grayscale coefficient of the grayscale, when i is not the grayscale displayed by the pixels in a first display area currently calculated, $N_i$ represents the number of pixels displaying the grayscale in the display area; when i is the grayscale displayed by the pixels in the first display area currently calculated, $N_i$ represents the number of pixels displaying the grayscale in the currently calculated first display area;

determining a first grayscale weight coefficient from the number H of first grayscale weight coefficients as a final first grayscale weight coefficient; and determining the target gamma curve based on the final first grayscale weight coefficient.

11. The control method according to claim 1, wherein controlling the pixels in the display area to display based on the target gamma curve further comprising:

stopping a voltage drop compensation function of the display panel.

12. The control method according to claim 1, after controlling the pixels in the display area to display based on the target gamma curve, the method further comprising:

adjusting a brightness of the display area based on the target gamma curve.

13. A non-transitory computer-readable storage medium containing program instructions that, when being executed, causes a computer to perform the control method according to claim 1.

14. A control device for a display panel, a display mode of the display panel including a normal display mode and a partial highlight display mode, the control device comprising:

at least one processor;

at least one memory coupled to the at least one processor; and a bus, wherein:

the at least one processor and the at least one memory are configured to communicate to each other through the bus, and the at least one processor is configured to call a program instruction stored in the at least one memory to:

acquire display information of a display area in the display panel in the partial highlight display mode, the display information including a grayscale corresponding to each pixel to be displayed in a next frame, and a number of pixels to display each corresponding grayscale;

determine a target gamma curve based on the display information including the grayscale corresponding to each pixel to be displayed and the number of pixels to display each corresponding grayscale, wherein, after the target gamma curved is determined; and control pixels in the display area to display based on the target gamma curve, wherein a difference between a display brightness corresponding to each grayscale in the determined target gamma curve and a target display brightness required for pixels to display each corresponding grayscale in the partial highlight display mode is within a predetermined range.

15. The display device according to claim 14, wherein the at least one processor is further configured to call a program instruction stored in the at least one memory to:

calculate a first grayscale weight coefficient based on the display information, the first grayscale weight coefficient being $G_{APL}$, $$G_{APL}=\sum_{i=1}^{255}\left(k_i*\frac{i}{N_i}\right),$$

where i indicates a grayscale, $k_i$ indicates a grayscale coefficient of the grayscale, and $N_i$ indicates the number of pixels displaying the grayscale i in the display area; and determine the targe gamma curve based on the first grayscale weight coefficient.

16. The display device according to claim 15, wherein the at least one processor is further configured to call a program instruction stored in the at least one memory to:

pre-store a plurality of gamma curves in the display panel, the plurality of gamma curves including M highlight gamma curves and a basic gamma curve corresponding to the partial highlight display mode, a display brightness corresponding to a first grayscale in any one of the M highlight gamma curves being greater than a display brightness corresponding to the first grayscale in the basic gamma curve, a display brightness corresponding to a first grayscale of any two highlight gamma curves in the M highlight gamma curves being different, M being a positive integer greater than or equal to 1;

set a plurality of value ranges based on the plurality of pre-stored gamma curves, a quantity of the value range being K, K=M+1, and one value range corresponding to one gamma curve in the plurality of gamma curves; and based on a value range of the first grayscale weight coefficient, use a gamma curve corresponding to the value range of the first grayscale weight coefficient as the target gamma curve.

17. The display device according to claim 15, wherein the at least one processor is further configured to call a program instruction stored in the at least one memory to:

pre-store the basic gamma curve corresponding to the partial highlight display mode in the display panel; and determine the target gamma curve based on the first grayscale weight coefficient and the basic gamma curve.

* * * * *